Patented Oct. 27, 1936

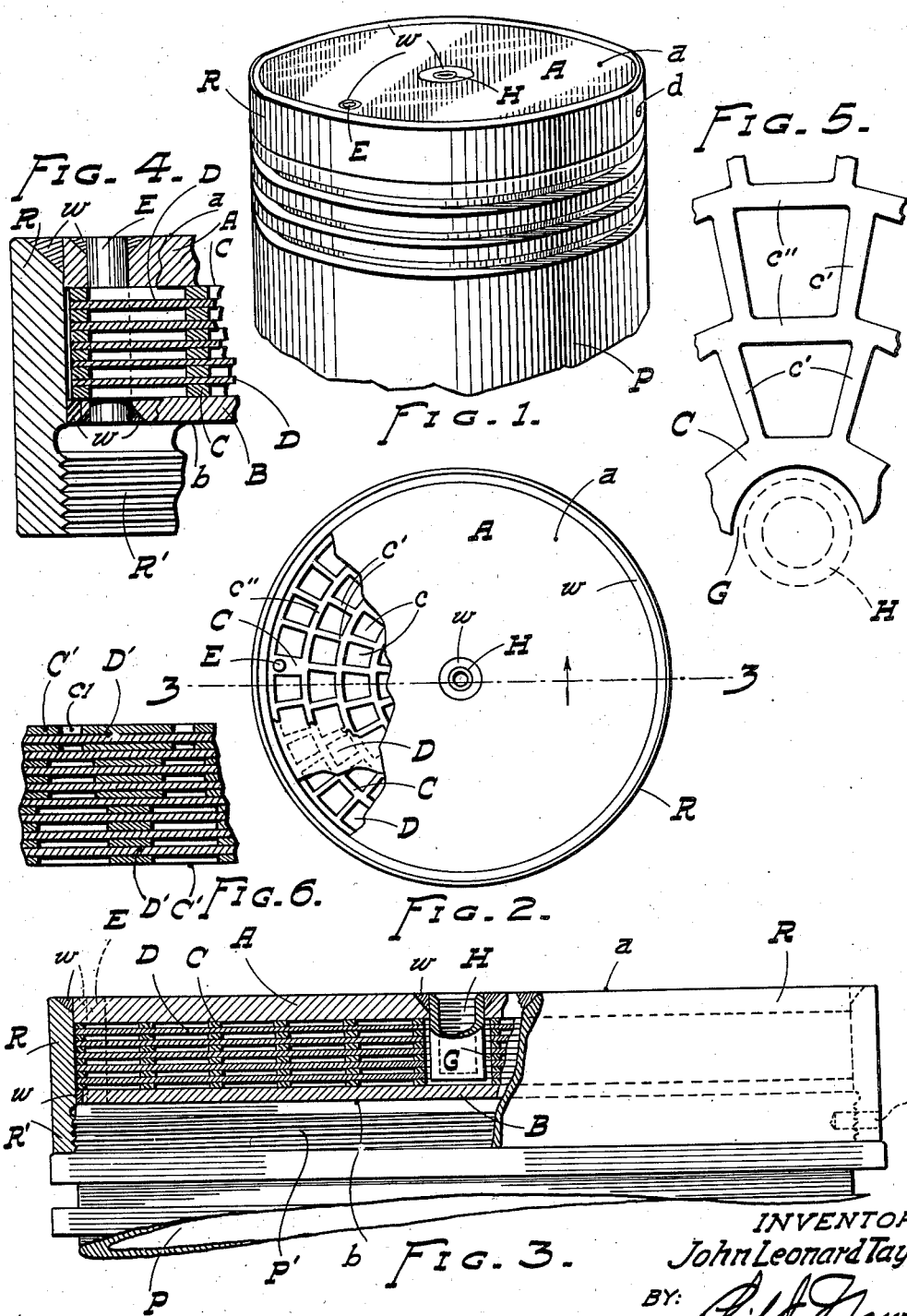

2,058,741

UNITED STATES PATENT OFFICE 2,058,741

INSULATING PISTON STRUCTURE

John Leonard Taylor, Milwaukee, Wis.

Application December 7, 1931, Serial No. 579,449

12 Claims. (Cl. 309—9)

This invention relates to pistons, and more particularly to those in which it is desirable to prevent the transmission of large quantities of heat therethrough, and an object of the invention is to generally improve the construction and operation of apparatus of this class.

A further object is to protect the piston from excessively high temperatures, and further objects are to prevent the loss of an excessive amount of heat through the piston of an engine or pump; to prevent the transmission of an excessive amount of heat to the crank-case of such a machine; to prevent decomposition of the crank-case lubricant by such heat; and to provide a high temperature surface in an engine cylinder to facilitate ignition and combustion.

Further objects are to provide a device of this class characterized by cellular metal construction; to furnish a device which may form a unitary part of a piston; to supply as a separate article of manufacture a device of the above character which may be applied to pistons as an attachment; and to provide suitable structural details to facilitate the construction and application of the above.

Other objects and advantages will appear from the following specification and accompanying drawing in which:

Fig. 1 is a general assembly view of a piston embodying the invention disclosed.

Fig. 2 is a broken top plan view of the structure shown in Fig. 1.

Fig. 3 is an enlarged sectional elevational view on line 3—3 of Fig. 2.

Fig. 4 is a magnified sectional fragmentary view.

Fig. 5 is an enlarged fragmentary view of an element employed.

Fig. 6 is a diagram of a laminated modification.

Similar characters of reference apply to like parts and features throughout the several views.

A piston P in the illustrative embodiment is threaded at P' to receive the improvement here concerned, which is an attachable unit threaded to be joined to the aforesaid piston, although other well known methods of attaching the unit are contemplated as part of the invention. Within the unit are disc elements preferably of different gauge thicknesses, arranged as laminations to form an assembly having cellular properties which provides a piston extension that functions as a heat exchanger, and also, as a means for retarding travel of the combustion heat to prevent the transferring excessive quantities of same to the piston, which incidentally eliminates the carbonization of lubricating-oil splashed within said piston and minimizes transmission of heat to the crank case. The assembly comprises a ring or coupling member R threaded at R' to connect with the piston P at P'; the ring in the present instance surrounding a crown or top plate A of major thickness to form a piston head. The ring also embraces a bottom plate B, preferably of less thickness against which the piston P abuts when operatively attached. The ring is locked in position by a dowel screw d located in the threaded apron R'. Clamped between the plates A and B is a group of thin discs or laminations of alternate perforate and imperforate character, respectively designated as C and D, in the present instance of slightly less diameter than the ring enclosure to allow for expansion, these discs forming spacing and insulating means between the discs A and B. The discs A, B, C, and D are aligned in their intended relationship by an assembling dowel E. The said relationship requires that the discs C be superposed so that perforations c will be substantially aligned throughout the said group but they are preferably displaced slightly from exact alignment for reasons which will appear below. The laminations C—D and top disc plate A have an axial aperture G to admit an interiorly threaded cup-shaped tube or socket H which is fixedly welded to the plate A, but depends free of the discs C—D and the bottom plate B in order to allow for expansion of said tube without affecting, either, the laminations or the bottom plate. The threading of the bore permits of handily removing the piston from an engine or the like by inserting a similarly threaded bolt in said bore.

The ring R and plates A and B are preferably welded together, as indicated by the character W, to produce a unitary cellular element, the dead-air spaces of which retard the passage of heat from the cylinder or combustion space, to the piston P so as to prevent development of excessive temperatures therein. The planed areas (a) and (b) have their welds machine-finished to eliminate all roughness, and to present those polished surfaces requisite in structures of this classification.

The top disc-plate A will, during motor operation, retain sufficient heat, because of its comparative thickness, to serve as an ignition "lead-off" means of great value, especially in engines driven by the heavier fuel oils. The plate will radiate most of the heat absorbed during one combustion period for raising the temperatures of the air during the succeeding compression period so as to give an exceedingly high compression temperature favorable to prompt ignition and complete combustion.

The laminations D function as partition walls which seal the voids c of the perforated discs C. The apertures c are disposed in annular series around the discs C, the apertures of successive annuli, however, being somewhat circumferentially displaced from those of the adjacent annuli so as to avoid uninterrupted radial ribs running from the center to the periphery of the laminations, which might invite a radial buckling in the plates under high temperature conditions thus creating waves that would destroy the flat contact desired between discs D and C at the strips c''. Further, the preferred method of staggered openings is a very practical one in the metal blanking operations by which the discs C are produced, as distinguished from blanking with the webs disposed in radial alignment, the preferred method permitting the metal to be readily held down while the apertures are being stamped out.

In the present arrangement a high percentage of voids is possible; the proportion of contacting surface area, between C and D, being, approximately only 9 per cent of the whole area.

The volume or cross section of material available for transmitting heat to the piston proper is accordingly very small as compared with the area of the piston head exposed to the hot gas.

The number of laminations C and D, here shown is preferably for a 7'' diameter piston, larger and smaller pistons having, respectively, more or less laminations. The device may, particularly in small pistons, form part of complete pistons manufactured of tubular stock, the device being preferably welded in place in or on the end of the tube to form the closed end or head of the piston.

Fig. 6 is a modified arrangement of laminations for the above described purposes. The discs are punched to have holes cl that increase in size as the piston is approached, thereby graduating the heat transmitting area or cross section, reducing it from the head toward the piston proper. This provides substantial area to resist pressure where the metal is highly heated and less resistant, but reduces the area where the temperature is lower and the metal stronger.

In operation this piston structure largely prevents transmission of heat through the piston head, the dead-air cells formed by the laminations being an excellent heat insulating medium, and even when they are formed of metal which is a good heat conductor, the exceedingly small area or volume of metal available for transmission of heat preventing any substantial flow. The heat transmission is further resisted by the numerous imperfect mechanical contacts or joints between the laminations through which the heat must flow in traversing the head.

When the piston is used in an internal combustion engine, the plate A becomes highly heated since escape of heat to the piston skirt is virtually cut off by the laminations, and this, particularly in engines in which the fuel is injected into the compressed air at the desired time for combustion, insures immediate ignition of the entering charge, preventing delayed ignition, detonation, and incomplete combustion. The highly heated material in contact with the burning gases is an effective catalytic, and the burning of even heavy oils is clean and accomplished with a minimum of smoke and carbon deposit.

The above being a complete description of an illustrative embodiment of the invention, what is claimed as new, and desired to be secured by Letters Patent of the United States is:—

1. A piston for internal combustion engines having a cellular head comprising metallic laminations lying in horizontal planes, said laminations having plural sets of concentric apertures radially staggered, said apertures exceeding in area the remaining metal in each of the apertured laminations, and plain laminations separating the apertured laminations.

2. A piston for internal combustion engines having a heat absorbing casing inclosing a heat retarding assembly, said casing threaded about the piston as an integral part thereof, said assembly containing a cellular mass of plain and perforated laminations, forming a temperature detent, a crown of major thickness and a piston abutting disc of minor thickness providing completed outer surfaces for the aforesaid cellular mass.

3. A piston for internal combustion engines having a body portion and a casing means, a laminated unit hermetically sealed within said casing means, said means adapted to embrace and abuttingly attach to said body portion, said unit comprising a cellular body composed of laminations alternately providing apertures therein, apertures in successive laminations increasing in area as the joint between said casing and said body portion is approached.

4. In a piston for an internal combustion engine the combination of a piston body portion and a piston head portion, said head portion comprising a solid top plate disposed to receive heat from the combustion of the charge in an engine cylinder, and a series of insulating laminations disposed between said top plate and said body portion, certain of said laminations being apertured, and others of said laminations being plain, the portions of the laminations between the apertures being displaced from each other, in successive laminations, to avoid the formation of a continuous heat conducting path downwardly from said top plate through said portions between said apertures to said piston body.

5. In a piston for an internal combustion engine the combination of a piston body portion and a piston head portion, said head portion comprising a solid top plate disposed to receive heat from the combustion of the charge in an engine cylinder, and a series of insulating laminations disposed between said top plate and said body portion, certain of said laminations being apertured, and others of said laminations being plain, the apertures in said apertured laminations being arranged in a plurality of substantially concentric circular paths about the center of said laminations, the portions of said laminations between successive apertures of one path being circumferentially off-set from those of another path to avoid the formation of continuous radial ribs in said apertured laminations.

6. As an article of manufacture a head for an engine piston comprising an annular coupling element arranged to embrace the end portion of an engine piston, a top plate fixed with said coupling element, and insulating means disposed beneath said top plate and within said annular element in position to lie between said top plate and a piston body to which said head may be attached, and operative to impede the flow of heat from said top plate to said piston body.

7. In a piston the combination of a piston head portion and a piston body portion, said head comprising a solid top plate disposed to receive heat from the charge in a working cylinder, and a series of laminations disposed between said top plate and said body portion, certain of said laminations being apertured, and others of said laminations being plain, and said apertured laminations and said plain laminations being superposed to provide a cellular heat insulating body between said top plate and said body portion.

8. In a piston the combination of a piston body portion and a piston head portion, said head portion comprising a solid top plate disposed to receive heat from the charge in a working cylinder, a dowel fixed with said top plate and extending therefrom toward said piston body, a plurality of laminations interposed between said plate and body and having apertures engaging said dowel permitting said dowel to locate said laminations relatively to said top plate, certain of said laminations being apertured and others of said laminations being plain, said laminations when superposed on said dowel forming a cellular heat insulating body between said top plate and said body portion.

9. A piston structure as claimed in claim 8 in which a hollow dowel is provided with means for engaging a piston lifting element.

10. A piston for internal combustion engines having a body portion, a ring enclosure fixed with said body, a plurality of laminations of varying thicknesses, certain of said laminations being perforated, and said laminations being welded into a structure comprising with said ring enclosure an hermetically sealed and armoured cellular pad forming the upper portion of said piston body, said body entering into said enclosure and abutting the lowest of said laminations.

11. In a piston head for internal combustion engines the combination of a solid top plate disposed to receive heat from the combustion of the charge in an engine cylinder, and a series of insulating laminations disposed between said top plate and said body portion, certain of said laminations being apertured, and others of said laminations being plain, the portions of the laminations between the apertures being disposed, in successive laminations, in predetermined relation to each other, and dowel means engaging said laminations and arranged to insure assembly thereof in said predetermined relation.

12. A piston for internal combustion engines having a body portion, a ring enclosure fixed with said body, and a plurality of laminations within said ring, alternate laminations being relatively thick, and the remaining laminations being perforated whereby said laminations collectively form a cellular insulating pad, and upper and lower imperforate relatively thick laminations forming the upper and lower boundaries of said pad, and said ring and said upper and lower laminations being welded into a unitary heat resisting element forming the upper portion of said piston.

JOHN LEONARD TAYLOR.